United States Patent [19]

Bundy et al.

[11] 4,078,941

[45] Mar. 14, 1978

[54] HIGH BULKING CALCINED CLAY PIGMENTS AND METHODS OF MAKING THE SAME

[75] Inventors: Wayne M. Bundy, Westfield; Thomas D. Thompson, Flemington, both of N.J.

[73] Assignee: Yara Engineering Corporation, Elizabeth, N.J.

[21] Appl. No.: 748,050

[22] Filed: Dec. 6, 1976

[51] Int. Cl.² ............................................. C09C 1/42
[52] U.S. Cl. .......................... 106/308 N; 106/288 B; 106/72
[58] Field of Search ................. 106/288 B, 308 N, 72

[56] References Cited

U.S. PATENT DOCUMENTS

| | | | |
|---|---|---|---|
| 2,852,406 | 9/1958 | Riegler et al. | 106/308 N |
| 2,982,665 | 5/1961 | Wilcox | 106/308 N |
| 3,029,209 | 4/1962 | Ferrigno | 106/308 N |
| 3,080,256 | 3/1963 | Bundy | 106/308 N |
| 3,211,565 | 10/1965 | Bundy | 106/308 N |

*Primary Examiner*—Patrick P. Garvin
*Assistant Examiner*—J. V. Howard
*Attorney, Agent, or Firm*—Buell, Blenko & Ziesenheim

[57] ABSTRACT

This invention provides a high bulking clay consisting essentially of selectively flocculated ultra fine particles of clay coated with a member from the group consisting of polyfunctional amines and long chain amines.

9 Claims, No Drawings

HIGH BULKING CALCINED CLAY PIGMENTS AND METHODS OF MAKING THE SAME

This invention relates to the production of calcined clay pigments and methods of making the same and particularly to a calcined clay product consisting of finer particles and producing higher void volume in coatings.

The demand for opacifying pigments in various industries, such as for example, in coating materials, has been long recognized and many mineral materials have been proposed and used. The primary and most used opacifier for this purpose is titanium dioxide.

We have discovered that we can obtain better opacity and improved brightness and reflectance in coatings as compared with $TiO_2$, by the use of kaolinite which has been treated to incorporate voids to form a high bulking clay and calcined.

We have found that this can be accomplished by selective flocculation of ultra fine particles of clay and by coating the fine particles with polyfunctional amines and long chain amines.

We have found that kaolinite can be selectively flocculated to recover ultra fine particles by the use of low molecular weight (below 1,000,000) organic fluocculants. We prefer to use a mixture of polyamine and citric acid as the fluocculant in our process. The coating of kaolinite can be achieved by the use of short chain polyamines or long chain mono amines.

We have further discovered that this novel high bulking clay does not aggregate on calcination to the degree that ordinary untreated clays do and that the calcined clay is a much more effective extender of $TiO_2$ in paint systems than is untreated clay.

The invention will be perhaps most readily understood by reference to the following examples.

EXAMPLE I

A kaolinite generally known as Mine 52 T from the Dry Branch, Ga., area was blunged in water with 0.08% sodium polymetaphosphate and sodium hydroxide (0.4% solution) to pH 7.4. The crude slurry was then fractionated to 0.10 cps at 10 minutes (i.e. 92% less than 2µ). The pH of the recovered fraction was raised to 10.0 using sodium hydroxide (0.40% solution). The fraction was then treated with 0.10% ethylenediamine + 0.30% citric acid in a 0.40% solution of water. It was then flocculated to pH 2.5 using a 10% solution of sulfuric acid and bleached using 7 lbs./ton of sodium hydrosulfite, filtered and rinsed. The filter cake was then dried at 65° C., pulverized and calcined. The control sample was treated in a similar fashion with the exception of the pH adjustment was after fractionation and the chemical treatment.

EXAMPLE II

Another sample of Mine 52 T kaolinite from the Dry Branch, Ga., area was blunged in water with 0.08% sodium polymetaphosphate and sodium hydroxide (0.40% solution) to pH 7.4. The slurry was then fractionated to 0.10 cps at 10 minutes. The pH of the recovered fraction was raised to 10.0 using sodium hydroxide (0.40% solution). The fraction was then treated with 0.15% ethylenediamine + 0.15% citric acid in a 0.30% solution of water. It was then flocculated to pH 2.5 using a 10% solution of sulfuric acid and bleached using 7 lbs./ton of sodium hydrosulfite, filtered and rinsed. The filter cake was dried at 65° C., pulverized and calcined.

The two kaolinites, plus the control, were then evaluated in a 65% PVC flat latex paint and the opacity and the sheen were determined. The values appear in Table I along with a % 325 mesh residue and CPS (Centrifugal Particle Size).

EXAMPLE III

A kaolinite generally known as Meeks Crude from the Sandersville, Ga., area was blunged in water with 0.08% sodium polymetaphosphate, after which the slurry pH was adjusted to 7.4 with sodium hydroxide (0.40% solution) and then fractionated to 0.05 cps at 10 minutes (i.e. 96% less than 2µ). The pH of the recovered fraction was raised to 8.8 using sodium hydroxide (0.40% solution). The fraction was then treated with 0.1% citric acid + 0.1% 1,6-hexanediamine as a 0.2% solution of water. It was then flocculated to a pH 2.5 using a 10% solution of sulfuric acid and bleached using 7 lbs./ton of sodium hydrosulfite, filtered and rinsed. The filter cake was then dried at 65° C. and pulverized prior to calcination. Calcination was carried out by heating the clay to 1050° C. for 1 hour. The anhydrous kaolinite was pulverized a second time after calcination.

The kaolinite was evaluated as an extender pigment in a latex flat paint. Additional data were gathered on these pigments with regard to CPS (Centrifugal Particle Size), percent greater than 325 mesh, opacity, and sheen.

EXAMPLE IV

Another sample of the Meeks Crude kaolinite from the Sandersville, Ga., area was blunged in water with 0.08% sodium polymetaphosphate and sodium hydroxide (0.40% solution) to pH 8.8. The crude slurry was then fractionated to 0.06 cps at 10 minutes. The pH of the recovered fraction remained at 8.8. The fraction was then treated with 0.10% hexamethylenediamine + 0.10% citric acid in a 0.20% solution of water. It was then flocculated to pH 2.5 using 10% solution of sulfuric acid and bleached using 7 lbs./ton of sodium hydrosulfite, filtered and rinsed. The filter cake was then dried at 65° C., pulverized and calcined.

EXAMPLE V

A third sample of kaolinite from the Dry Branch, Ga., area, Mine 22 AA, was blunged in water with 0.08% sodium polymetaphosphate and sodium hydroxide (0.40% solution) to pH 7.4. The crude slurry was then fractionated to 0.06 cps at 10 minutes. The pH of the fractionated material was raised to 8.8 using sodium hydroxide (0.40% solution). The fraction was then treated with 0.10% hexamethylenediamine + 0.10% citric acid in a 0.20% solution of water. It was then flocculated to pH 2.5 using 10% solution of the sulfuric acid and bleached using 7 lbs./ton of sodium hydrosulfite, filtered and rinsed. The filter cake was then dried at 65° C., pulverized and calcined. A control was prepared by the same method as expressed in Example I.

EXAMPLE VI

Same as Example V except Mine 66 from the Dry Branch, Ga., area was evaluated.

EXAMPLE VII

Same as Example V except Mine 52 V from the Dry Branch, Ga., area was used.

EXAMPLE VIII

Same as Example V except Mine 52 W from the Dry Branch, Ga., area was used.

EXAMPLE IX

Mine 52 W from the Dry Branch, Ga., area was fractionated and treated in the same fashion as Example VIII except three different particle size ranges were evaluated. The first one (A) being fractionated to 0.19 cps at 10 minutes (81% less than 2μ), the second one (B) being fractionated to 0.10 cps at 10 minutes (92% less than 2μ), and the third sample being Example VIII.

EXAMPLE X

A kaolinite generally known as Mine 52 V from the Dry Branch, Ga., area was blunged in water with 0.08% sodium polymetaphosphate and sodium hydroxide (0.40% solution) to pH 7.4. The crude slurry was then fractionated to 0.10 cps at 10 minutes. The pH of the fractionated material was raised to 8.8 using sodium hydroxide (0.40% solution). The fraction was then treated with 0.15% 1,6-hexanediamine + 0.15% citric acid in a 0.30% solution of water. It was then flocculated to pH 2.5 using 10% solution of sulfuric acid and bleached using 7 lbs./ton sodium hydrosulfite, filtered and rinsed. The filter cake was then dried at 65° C., pulverized and calcined.

EXAMPLE XI

Same as Example X except that the pH of the fractionated material was raised to 10.0 using sodium hydroxide prior to chemical treatment.

EXAMPLE XII

Same as Example XI except that Mine 66 from the Dry Branch, Ga., area was used.

EXAMPLE XIII

Same as Example XI except that a 20/80 percent blend of fractionated Mine 66 and Mine 52 V was used.

EXAMLE XIV

A kaolinite generally known as Mine 22 AA from the Dry Branch, Ga., area was blunged in water with 0.08% sodium polymetaphosphate, after which the slurry pH was adjusted to 7.4 and fractionated to 0.10 cps at 10 minutes (i.e. 92% less than 2μ). After the appropriate amount of 1,6-hexanediamine (0.20%) is added, the pH is lowered to 2.5 with a 10% solution of sulfuric acid. After the reduction of pH, the treated slurry is bleached using 7 lbs./ton of sodium hydrosulfite, filtered and rinsed. The filter cake was then dried at 65° C., pulverized and calcined.

EXAMPLE XV

Same as Example XIV except 1.25% tallowamine was used instead of 0.2% 1,6-hexanediamine.

EXAMPLE XVI

Mine 52 W from the Dry Branch, Ga., area was blunged in water with 0.2% sodium polymetaphosphate. The crude slurry was then fractionated to 0.10 cps at 10 minutes. The fraction was then treated with 1.2% tallowamine and the pH lowered to 2.5 with a 10% solution of sulfuric acid. After pH reduction, the slurry is bleached with 7 lbs./ton sodium hydrosulfite, filtered and rinsed. The filter cake was then dried at 65° C., pulverized and calcined.

EXAMPLE XVII

Same as Example XVI except 1.0% cocoamine was used instead of tallowamine.

EXAMPLE XVIII

Same as Example XVI except 0.6% amine pitch was used as a replacement for tallowamine.

EXAMPLE XIX

Same as Example XVI except 2.0% ditallowdimethyl ammonium chloride was used instead of tallowamine.

TABLE I

| Sample | CPS 1 | 3 | 10 | 15 | % > 325 Mesh Residue | % Opacity | 85° Sheen |
|---|---|---|---|---|---|---|---|
| Mine 52 T Control | .10 | .15 | .27 | .32 | 0.52 | 93.1 | 3.0 |
| Example I | .12 | .21 | .40 | .49 | 0.44 | 94.4 | 3.0 |
| Example II | .12 | .20 | .37 | .45 | 0.34 | 94.1 | 3.0 |

TABLE II

| Sample | CPS 1 | 3 | 10 | 15 | % > 325 Mesh Residue | % Opacity | 85° Sheen |
|---|---|---|---|---|---|---|---|
| Meeks Crude Control | .06 | .10 | .14 | .18 | 0.52 | 92.7 | 5.0 |
| Example III | .03 | .05 | .08 | .09 | 0.18 | 93.8 | 6.0 |
| Example IV | .01 | .04 | .09 | .11 | 0.24 | 93.1 | 5.5 |

TABLE III

| Sample | CPS 1 | 3 | 10 | 15 | % > 325 Mesh Residue | % Opacity | 85° Sheen |
|---|---|---|---|---|---|---|---|
| Mine 22 AA Control | .13 | .19 | .25 | .30 | 1.63 | 91.8 | 3.0 |
| Example V | .10 | .17 | .25 | .30 | 0.80 | 93.3 | 3.5 |
| Mine 66 Control | .08 | .17 | .20 | .22 | 1.73 | 93.0 | 3.5 |
| Example VI | .10 | .15 | .20 | .22 | 1.40 | 93.0 | 4.0 |
| Mine 52 V Control | .05 | .10 | .15 | .20 | 0.80 | 92.4 | 4.0 |
| Example VII | .05 | .09 | .13 | .18 | 0.60 | 92.6 | 4.0 |
| Mine 52 W Control | .10 | .15 | .20 | .24 | 1.44 | 92.3 | 4.5 |
| Example VIII | .05 | .09 | .14 | .19 | 0.24 | 93.6 | 6.5 |

TABLE IV

| Sample | CPS 1 | 3 | 10 | 15 | % > 325 Mesh Residue | % Opacity | 85° Sheen |
|---|---|---|---|---|---|---|---|
| Control A | .10 | .20 | .30 | .36 | 0.23 | 91.3 | 3.0 |
| Example IX A | .10 | .19 | .31 | .39 | 0.23 | 92.1 | 3.5 |
| Control B | .10 | .15 | .22 | .30 | 0.60 | 92.1 | 3.5 |
| Example IX B | .10 | .13 | .23 | .30 | 0.60 | 92.7 | 4.0 |
| Control VIII | .10 | .15 | .20 | .24 | 1.44 | 92.3 | 4.5 |
| Example VIII | .05 | .09 | .14 | .19 | 0.24 | 93.6 | 6.5 |

TABLE V

| Sample | CPS 1 | 3 | 10 | 15 | % > 325 Mesh Residue | % Opacity | 85° Sheen |
|---|---|---|---|---|---|---|---|
| Mine 52 V Control | .05 | .10 | .19 | .25 | 0.75 | 92.8 | 4.0 |
| Example X | .07 | .11 | .20 | .25 | 0.45 | 93.1 | 4.0 |
| Example XI | .04 | .09 | .20 | .23 | 0.26 | 93.7 | 4.5 |
| Mine 66 Control | .08 | .10 | .16 | .18 | 0.52 | 93.7 | 4.5 |
| Example VI | .10 | .15 | .20 | .22 | 1.44 | 93.0 | 4.5 |
| Example XII | .08 | .11 | .16 | .18 | 0.60 | 94.3 | 5.0 |
| Control 20% Mine 66/ 80% Mine 52 V | .08 | .11 | .18 | .25 | 0.81 | 92.9 | 4.0 |

TABLE V-continued

| Sample | CPS 1 | 3 | 10 | 15 | % > 325 Mesh Residue | % Opacity | 85° Sheen |
|---|---|---|---|---|---|---|---|
| Example XIII | .04 | .09 | .13 | .16 | 0.42 | 94.0 | 5.0 |

TABLE VI

| Sample | CPS 1 | 3 | 10 | 15 | % > 325 Mesh Residue | % Opacity | 85° Sheen |
|---|---|---|---|---|---|---|---|
| Mine 22 AA Control | .10 | .15 | .24 | .30 | 0.95 | 92.7 | 3.5 |
| Example XIV | .07 | .12 | .20 | .25 | 0.30 | 93.4 | 4.0 |
| Example XV | .05 | .10 | .23 | .31 | 0.10 | 92.7 | 4.0 |

TABLE VII

| Sample | CPS 1 | 3 | 10 | 15 | % > 325 Mesh Residue | % Opacity | 85° Sheen |
|---|---|---|---|---|---|---|---|
| Mine 52 W Control | .09 | .14 | .27 | .32 | — | 93.0 | 10 |
| Example XVI | .02 | .05 | .16 | .22 | — | 94.1 | 13 |
| Example XVII | .03 | .08 | .20 | .29 | — | | |
| Example XVIII | .04 | .09 | .22 | .30 | — | | |
| Example XIX | .04 | .07 | .16 | .20 | — | | |

Tables I through VII were evaluated using 55% PVC Interior Flat Emulsion paint of the following formulation:

| Interior Flat Emulsion Formulation, 55% PVC | |
|---|---|
| Materials | lbs./100 gals. |
| QP-4400 (2.5% solution) | 50 |
| Tamol 850 | 8 |
| CO-610 | 4 |
| KTPP | 1 |
| Defoamer | 4 |
| Ethylene Glycol | 25 |
| Carbitol Acetate | 10 |
| Water (total) | 175 |
| R-901 | 150 |
| Atomite | 210 |
| Extender | 100 |
| Let Down | |
| QP-4400 (2.5% solution) | 175 |
| Flexbond 315 | 281 |

It can be seen from these data that the treatment of this invention markedly reduces the tendency of the kaolin to aggregate.

While we have set out certain preferred practices and embodiments of our invention in the foregoing specification, it will be understood that this invention may be otherwise embodied within the scope of the following claims.

We claim:

1. A high bulking clay consisting essentially of selectively flocculated ultra fine particles of clay coated with sufficient amount of a member from the group consisting of polyfunctional amines and long chain amines to create voids among the particles.

2. A high bulking clay as claimed in claim 1 wherein the ultra fine particles have been selectively flocculated in the presence of low molecular weight organic flocculants.

3. A high bulking clay as claimed in claim 1 in which the selective flocculant has a molecular weight below 1,000,000.

4. A high bulking clay as claimed in claim 1 wherein the selective flocculant is a mixture of polyamine and citric acid.

5. The method of producing a high bulking clay comprising the steps of:
   a. selecting an ultra fine particle size kaolinite fraction,
   b. flocculating said ultra fine particle size kaolinite fraction in the presence of a member selected from the group consisting of polyfunctional amines and long chain amines in sufficient amount to create voids among the particles when dried, and
   c. recovering and drying the flocculated treated kaolinite.

6. The method as claimed in claim 5 wherein the kaolinite is flocculated by a low molecular weight organic flocculant.

7. The method as claimed in claim 6 in which the organic flocculant has a molecular weight less than 1,000,000.

8. The method as claimed in claim 5 wherein the selective flocculant is a mixture of polyamine and citric acid.

9. The method as claimed in claim 5 wherein the kaolinite recovered is calcined.

* * * * *